May 2, 1967  S. K. HAMBLING ETAL  3,317,251
BRAKE PRESSURE PROPORTIONING DEVICE
Filed July 31, 1964  4 Sheets-Sheet 1

Stewart Kevern Hambling
George Broadley Spence
Scrivener Parker Scrivener & Clarke

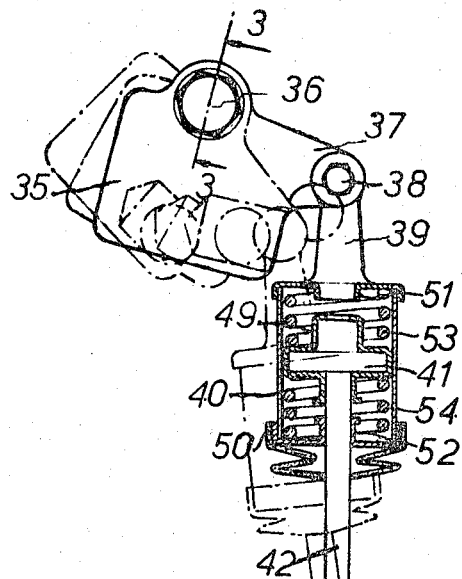
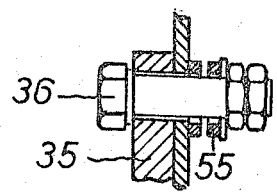
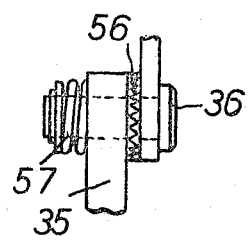

May 2, 1967  S. K. HAMBLING ETAL  3,317,251
BRAKE PRESSURE PROPORTIONING DEVICE
Filed July 31, 1964

Stewart Kevern Hambling
George Broadley Spence
Scrivener Parker Scrivener & Clarke May 2, 1967  S. K. HAMBLING ETAL  3,317,251
BRAKE PRESSURE PROPORTIONING DEVICE
Filed July 31, 1964  4 Sheets-Sheet 4

Stewart Kevern Hambling
George Broadley Spence
Scrivener Parker Scrivener & Clarke

United States Patent Office 3,317,251
Patented May 2, 1967

3,317,251
BRAKE PRESSURE PROPORTIONING DEVICE
Stewart Kevern Hambling, Tamworth, and George Broadley Spence, Coventry, England, assignors to Girling Limited, Birmingham, England, a British company
Filed July 31, 1964, Ser. No. 386,526
Claims priority, application Great Britain, July 31, 1963, 30,323/63; Sept. 5, 1963, 35,062/63; Nov. 12, 1963, 44,565/63; Dec. 16, 1963, 49,513/63; Feb. 15, 1964, 6,419/64; May 23, 1964, 21,386/64
7 Claims. (Cl. 303—24)

This invention relates to improvements in vehicle brakes.

When a vehicle is being decelerated by application of the brakes there is a transfer of weight from the rear wheels to the front wheels, and to avoid locking and skidding of the rear wheels various means have been proposed for limiting the maximum braking effort which can be applied to the rear wheels. In hydraulically operated braking systems some of the limiting means proposed have incorporated between the master cylinder and the slave cylinders of the rear wheel brakes an inertia-controlled valve which closes when a predetermined rate of deceleration is reached and prevents any subsequent increase in the pressure applied to the slave cylinders of the rear wheel brakes.

According to our invention, in an hydraulic braking system incorporating an inertia-controlled valve between the master cylinder and the slave cylinders of the brakes on one pair of wheels, means are also incorporated whereby, when braking is continued after closing of the inertia-controlled valve, fluid is supplied to these slave cylinders at a rate of pressure variation different from the rate of pressure increase in the master cylinder.

Where the inertia controlled valve is in the fluid line leading to the slave cylinders of the rear wheel brakes, fluid will be supplied to these slave cylinders at a rate of pressure increase lower than the rate of pressure increase in the master cylinder, while in the case of the front wheel brakes fluid will be supplied at a rate of pressure greater than the rate of pressure increase in the master cylinder.

The total braking effort can thus be increased without locking or skidding of the rear wheels under normal road surface conditions, so that a higher braking efficiency is obtained.

The rate of deceleration at which the inertia-controlled valve closes may be varied automatically in accordance with the loading of the braked wheels and means may be provided for preventing the application of the brakes with sufficient force to lock the wheels by very rapid operation of the brake pedal before the valve closes.

Some forms of control unit in accordance with our invention are illustrated by way of example in the accompanying drawings in which:

FIGURE 2 is an elevation partly in section of means for varying the angular position of a unit in accordance with the loading of a vehicle axle;

FIGURE 3 is a fragmentary section on the line 3—3 of FIGURE 2;

FIGURE 4 is a similar section showing an alternative arrangement;

Figure 1:
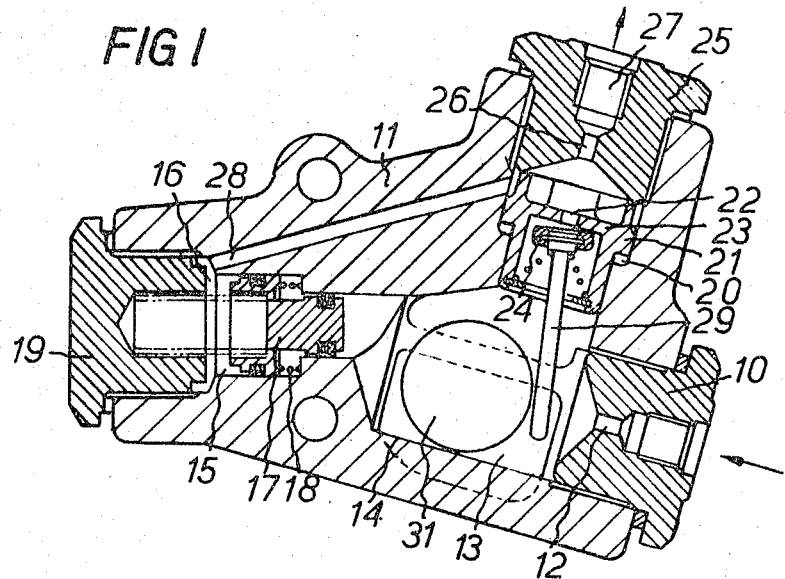
FIGURE 1 is a longitudinal section of one form of control unit.

The unit shown in FIGURE 1 is intended to be located in the fluid line between the master cylinder of an hydraulic braking unit and the slave cylinders of the brakes on the rear wheels of a vehicle.

A plug 10 screwed into a body 11 has a socket to receive a union for a pipe-line from the master cylinder. A passage 12 in the plug opens into a chamber 13 in the body having an inclined bottom surface 14. A stepped bore 15 leads out of the chamber 13, the smaller end of the bore opening into that chamber and the larger end opening into another chamber 16. A differential piston 17 working in the bore is loaded by a spring 18 which urges it in a direction towards the chamber 16. The forward end of the chamber 16 is closed by a plug 19.

Another bore 20 leading out of the upper end of the chamber 13 has fixed in it a fitting 21. A central orifice 22 is formed in a transverse partition 23 in the fitting and the orifice is controlled by a spring-loaded tipping valve 24 which seats against the underside of the partition. The upper end of the bore 20 is closed by a plug 25 having an axial passage 26 leading into a socket 27 adapted to be connected by a pipe-line to the slave cylinders of the rear wheel brakes. An internal passage 28 in the body connects the bore 20 between the plug 25 and the partition 23 with the chamber 16.

The stem 29 of the tipping valve 24 depends into the chamber 13, and a ball 31 free to roll on the inclined bottom of the chamber normally rests under gravity in the position shown in the drawing in which it holds the valve in the tipped open position.

The unit is adapted to be mounted in the vehicle with the axis of the bore 15 parallel to the fore and aft centre line of the vehicle, and the plug 19 at the forward end.

When the brakes are applied the end of the differential piston 17 of smaller area is exposed to the master cylinder pressure and the end of greater area which is in communication through the chamber 16 and the passage 28 with the hydraulic line leading to the rear wheel brake is exposed to the pressure applied to the brakes.

So long as the valve 24 is in the open or inoperative position fluid from the master cylinder flows through the chamber 13, the orifice 22, and the plug 25 to the brakes, and there is no movement of the differential piston as the line pressure acting on the end of the piston of greater area is balanced by the master cylinder pressure acting on the other end in combination with the loading of the spring 18, and the piston is maintained in a position of equilibrium.

When the rate of deceleration caused by the application of the brakes exceeds a predetermined value the inertia forces acting on the ball 31 cause it to roll forwardly up the inclined bottom of the chamber 13 so that the tipping valve 24 closes. If the master cylinder pressure is increased by continued depression of the pedal that pressure acting on the end of the differential piston of smaller diameter moves the piston axially to the left. The end of the piston of greater area acts on the fluid trapped in the line to the brakes by the closing of the valve and increases the pressure in that line, but owing to the differential areas of the two ends of the piston the rate of increase is less than the rate of increase in the master cylinder pressure.

If the unit is fixed in position in the vehicle the rate of deceleration at which the inertia-controlled valve closes is also fixed.

In a modification of the arrangement described above the unit is mounted for angular movement about a transverse axis and its angular position is varied in accordance with the loading of the axle carrying the braked wheels so that with increase in loading the inclination of the bottom of the chamber 13 is increased and the ball does not allow the valve to close until the rate of deceleration reaches a higher value.

The angular movement of the unit can be effected by any convenient means such as linkage sensitive to spring deflection.

One convenient arrangement is illustrated in FIGURES 2, 3 and 4. The unit 35 is mounted for angular movement about a stationary pivot 36 of which the axis is at right angles to the longitudinal centre line of the vehicle.

A lug 37 on the unit at its rear end has pivotally connected to it by a pin 38 a lug 39 secured to the upper end closure of a cylindrical housing 40. A piston 41 axially movable in the housing is secured to the upper end of a rod 42 which extends downwardly through the bottom closure of the housing. The bottom end of the rod is pivotally connected by a pin 43 to one end of a lever 44 mounted to rock about a fixed pivot 45. The other end of the lever is pivotally connected by a pin 46 to a lug on the axle 47 carrying the braked wheels.

The piston 41 is mounted in a cage 48 having upwardly and downwardly projecting abutments 49 and 50, and the top and bottom end closures of the housing 40 have complementary downwardly and upwardly extending abutments 51 and 52. Compression springs 53 and 54 located between the piston and the end closures normally hold the piston in the central position shown in which the abutments on the piston are spaced from those on the end closures. Small vertical movements of the axle are taken care of by the springs so that the angular position of the unit is not affected by rapid or short term movements of the axle due to irregularities of the road surface.

However if the axle loading is changed the lever 44 will move the piston upwardly or downwardly until one of the abutments on the piston engages the complementary abutment on the housing and the piston takes the housing 40 with it to alter the angular position of the unit about its pivot 36 and hence the inclination of the surface on which the inertia member rolls.

Means are preferably provided for preventing angular movement of the unit other than a positive movement effected by the axle loading.

FIGURE 3, which is a section on the line 3—3 of FIGURE 2, shows the pivot frictionally loaded by a spring washer 55.

FIGURE 4, which is a similar section, shows co-operating radially serrated washers 56 located on the unit and its mounting respectively and held in engagement by a spring washer 57 on the pivot pin 36.

The greater the vehicle loading the greater master cylinder pressure required to produce a predetermined rate of deceleration, and hence the rate of deceleration at which the inertia-controlled valve closes can also be varied by varying the inclination of the surface on which the ball rolls in accordance with the master cylinder pressure.

Figure 5:
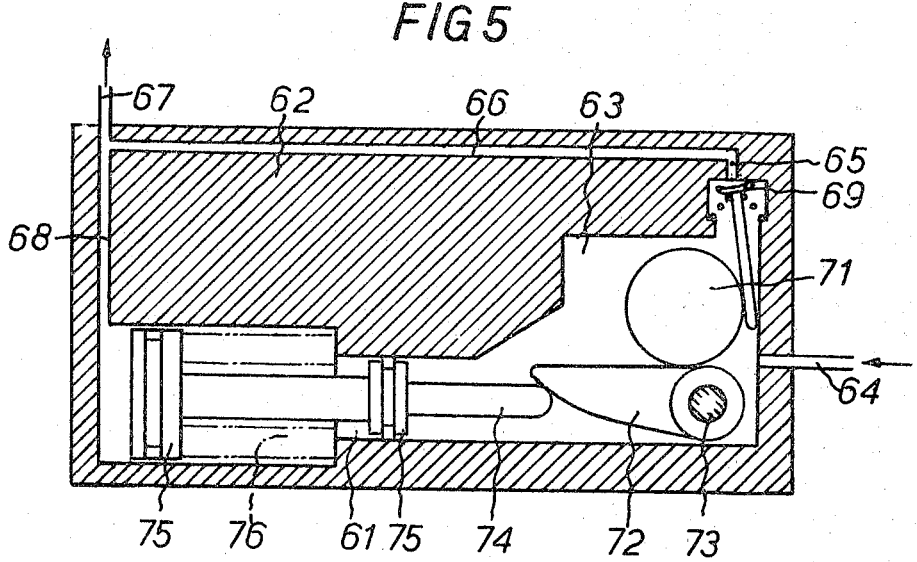
FIGURE 5 is a diagrammatic section of a modified form of unit.

One convenient arrangement is illustrated diagrammatically in FIGURE 5. A stepped cylinder bore 61 in a body 62 opens at its smaller end into a chamber 63 into which fluid from a master cylinder is fed through a pipeline 64. A port 65 in the upper end of the chamber communicates by way of a passage 66 with an outlet 67 leading to the slave cylinders of the brakes on the rear wheels of a vehicle. The outlet 67 is also in communication by way of a passage 68 with the end of the cylinder bore 61 of greater diameter. The port 65 is controlled by a spring-loaded tipping valve 69 of which the stem depends into the chamber 63 and is normally engaged by a ball 71. The ball is free to roll on the upper surface of a lever 72 pivoted for angular movement about a transverse pin 73 in the lower part of the chamber 63. The under side of the lever is curved or inclined upwardly from the pivot towards its free end and is engaged by an axial extension 74 of a differential piston 75 working in the bore 61. The piston is loaded by a compression spring 76 resiliently resisting movement of the piston to the right.

The smaller end of the piston is exposed to the master cylinder pressure in the chamber 63 and the larger end is exposed to the braking pressure through the passage 68.

Prior to the closure of the valve 69 the position of the differential piston is controlled by the spring 76 and by the hydraulic pressure in the system which is the same on both ends of the piston. Owing to the differential areas of the two ends of the piston an increase in the pressure moves the piston to the right and causes the extension 74 to engage the lever 72 and move it angularly in a clockwise direction to increase the inclination of its upper surface on which the ball rolls. An increase in the loading of the vehicle requires a higher master cylinder pressure to produce the rate of deceleration necessary to cause the ball to move to the left along the lever and allow the vave to close, so that the braking effort applied to the wheels before the valve closes increases with vehicle loading at a controlled or predetermined rate.

Figure 6:
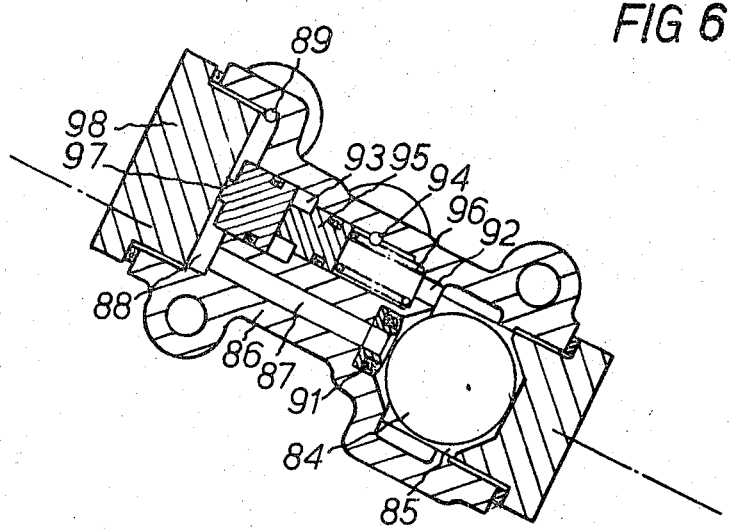
FIGURE 6 is a longitudinal section of another unit.

FIGURE 6 shows a unit in which the ball itself forms the moving valve member. The ball 84 is housed in a chamber 85 in a body 86. A longitudinal passage 87 extends from the chamber 85 into a chamber 88 which is located at the front end of the unit and out of which a port 89 leads to the slave cylinders of brakes on the rear wheels of the vehicle. An annular resilient seating 91 for the ball is arranged at the end of the passage 87 leading into the chamber 85. The upper end of the chamber 85 opens through a passage 92 into the smaller end of a stepped cylinder bore 93 which is connected through an inlet port 94 to the master cylinder. A differential piston 95 working in the bore 93 is loaded by a compression spring 96 which urges the piston towards the end of the cylinder of greater diameter and normally holds it against a stop formed by the engagement of an axially projecting spigot 97 on the piston with a plug 98 closing the chamber 88. The piston is formed in two parts for convenience but it can equally well be a single member.

The ball 84 is guided in its movement towards and away from the seating 91 by three angularly spaced longitudinal ribs or tracks 90, there being a substantial clearance between the ball and the tracks. The bottom track which is in vertical alignment with the axis of the ball is the only one with which the ball is in contact when the valve is closed so that there is no risk of the ball jamming between adjacent tracks.

The unit is mounted in the vehicle in an inclined position with the plug 98 at the forward end and the ball 84 normally rests under gravity at the right-hand end of the chamber 85 clear of the seating 91.

When the brake is applied and the rate of deceleration of the vehicle is below the value required to cause the ball to move fluid under pressure from the master cylinder flows between the ball and the stationary seating 91 and so to the slave cylinders of the brakes. At the same time the master cylinder pressure is acting on the smaller end of the differential piston 95 and the pressure applied to the brakes is acting on the larger end. So long as the valve is open these pressures are equal, and owing to the differential areas of the two ends of the piston the piston is moved towards the smaller end of the cylinder against the action of the spring 96 in which energy is stored.

When the rate of deceleration of the vehicle exceeds the predetermined value the ball moves into engagement with its seating and cuts off direct communication between the master cylinder and the slave cylinders.

Any increase in the pressure of fluid supplied by the master cylinder then acts on the smaller end of the diferential piston and with the assistance of the spring moves the piston towards the larger end of the cylinder against the pressure already existing on the output side of the valve which is the pressure applied to the slave cylinders. That pressure is therefore increased but at a rate lower than the rate of increase of the input or master cylinder pressure which will normally be that applied to the slave cylinders of the brakes on the other wheels of the vehicle.

When the differential piston is in engagement with its stop there is no further increase in the pressure on the output side and the device then acts as a normal cut off valve.

As the valve seat 91 is stationary and separate from the pressure producing means the movement of the ball has a standard value which is important for fast brake applications where the braking effort in the rear wheels can reach a value high enough to cause skidding if there is a variable time delay before the ball becomes effective to cut off the flow of fluid to the rear wheels.

A further advantage of this arrangement is that it partially compensates automatically under various loading conditions for the transfer of weight from the rear to the front wheels on deceleration of the vehicle and maintains on the rear wheels a braking effort which approaches the maximum possible without skidding.

The body 86 of the unit may also be mounted as described above for angular movement about a transverse axis by means sensitive to the loading of the vehicle so that the rate of deceleration at which the valve closes is varied in accordance with the vehicle loading.

Figure 7:
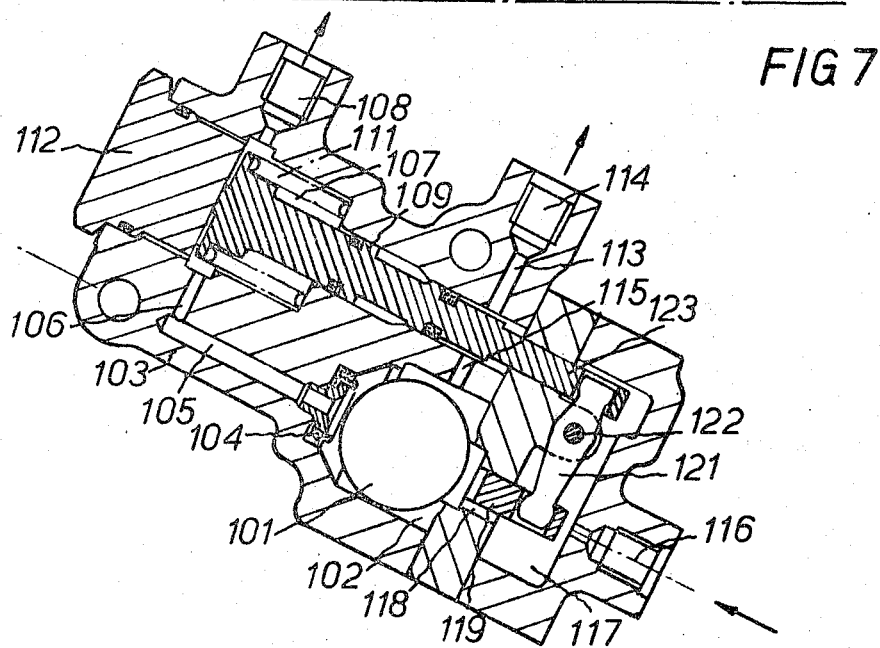
FIGURE 7 is a longitudinal section of a further unit.

Another method of controlling the point at which the valve closes in accordance with the pressure generated by the master cylinder and hence with the vehicle loading is shown in FIGURE 7.

In this unit the inertia member is a ball 101 freely movable in a chamber 102 in a body 103. The ball co-operates with a seating 104 at the rear end of a longitudinal passage 105 of which the front end is connected by a passage 106 with the larger end of a stepped longitudinal bore 107 from which an outlet 108 leads to the slave cylinders of the brakes on the rear wheels of the vehicle. A differential piston 109 working in the bore 107 is loaded by a spring 111 which normally holds the larger end of the piston in engagement with a stop formed by a plug 112.

The end of the cylinder of smaller diameter is in communication by way of a passage 113 with an outlet 114 leading to the slave cylinders of the brakes on the front wheels and by way of a passage 115 with the chamber 102. The master cylinder is connected to an inlet 116 leading into a space 117 from which a passage 118 in axial alignment with the passage 105 leads into the chamber 102. A magnet 119 is freely mounted in the passage 118 for movement towards and away from the ball. One end of a lever 121 pivoted at 122 in the body is in rocking engagement with the magnet and the other end is in rocking engagement with an extension 123 of the smaller end of the differential piston.

When the pedal is depressed to apply the brakes, fluid from the master cylinder flows through the passage 118, the chamber 102, and the passages 115 and 113 to the outlet 114 and so to the front wheel brakes, and through the passages 105 and 106 to the outlet 108 and so to the rear wheel brakes until the communication with the rear wheel brakes is closed by the engagement of the ball with the seating 104 as in the arrangement shown in FIGURE 5.

Normally the magnet 119 is spaced from the ball at such a distance that its effect on the movement of the ball is negligible, but when the hydraulic pressure is increased sufficiently to move the differential piston to the right the magnet is moved towards the ball and retards the movement of the ball towards the seating 104 so that the closing of the valve is delayed in proportion to the line pressure and hence to the vehicle loading.

The magnet may be a permanent magnet or it may be an electro-magnet which is energised when the vehicle is in motion, as for example by connecting it into or controlling it from the ignition circuit.

Figure 8:
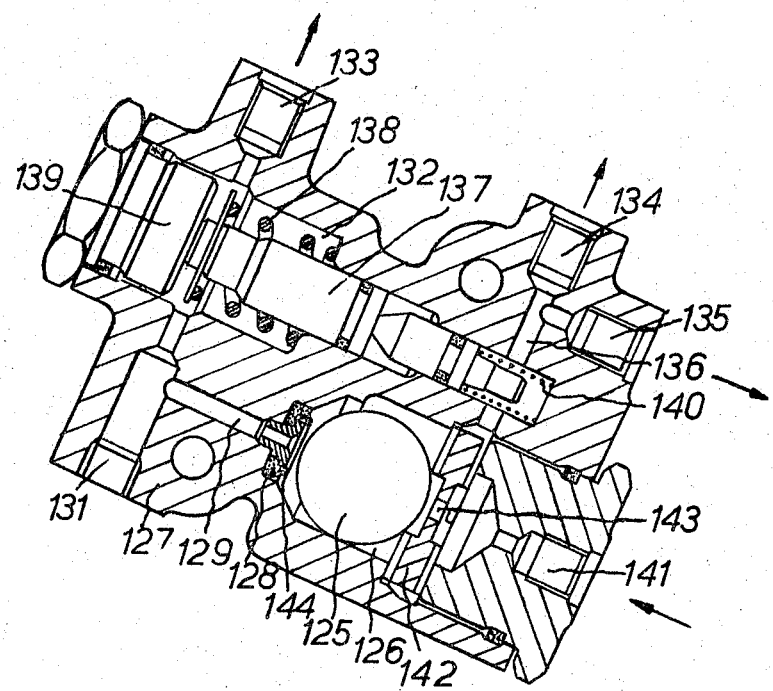
FIGURE 8 is a longitudinal section of a further modified unit.

FIGURE 8 illustrates another modification incorporating means for ensuring that on very rapid operation of the brake pedal sufficient braking effort cannot be applied to the brakes on the rear wheels to lock these wheels before the valve closes.

In this arrangement the inertia member is a ball 125 freely movable in a chamber 126 in a body 127. The ball co-operates with a seating 128 at the rear end of a longitudinal passage 129 in communication at its front end with an outlet 131 adapted to be connected to a pressure-operated stop light switch, to the larger end of a stepped cylinder bore 132 in the body, and to an outlet 133 leading to the rear wheel brakes. The smaller end of the cylinder bore is in communication with two outlets 134 and 135 leading to the front wheel brakes and is in communication with the chamber 126 through a passage 136. A differential piston 137 working in the stepped cylinder bore is loaded by a spring 138 which urges it to the left and normally holds it in engagement with a stop formed by a plug 139.

For ease of construction and installation th stepped piston is formed, as shown in the drawing, in two parts which are held together by a light spring 140 located in the rear end of the cylinder bore.

Fluid under pressure from a master cylinder enters through an inlet passage 141 in axial alignment with the passage 129. A deflector plate 142 having a central orifice 143 is located between the inlet passage 141 and the right hand end of the chamber 126.

The normal operation of the valve is the same as the other embodiments described above but in these embodiments very rapid operation of the brake pedal might force sufficient fluid through to the rear wheel brakes to lock these wheels and cause skidding before the valve is closed by the inertia forces acting on the ball. With the arrangement shown in FIGURE 8 fluid coming from the master cylinder flows through the orifice 143 into the chamber 126 and on rapid operation of the brake pedal the fluid flowing through the orifice forms a jet which impinges on the ball and urges it into engagement with its seating independently of the effect of the inertia forces.

The seating is preferably formed with a flexible lip 144 to ensure that the ball comes into sealing engagement with it even when the centre line of the ball is offset from that of the seating by the maximum distance permitted by the clearances between the ball and the chamber 126.

Figure 9:
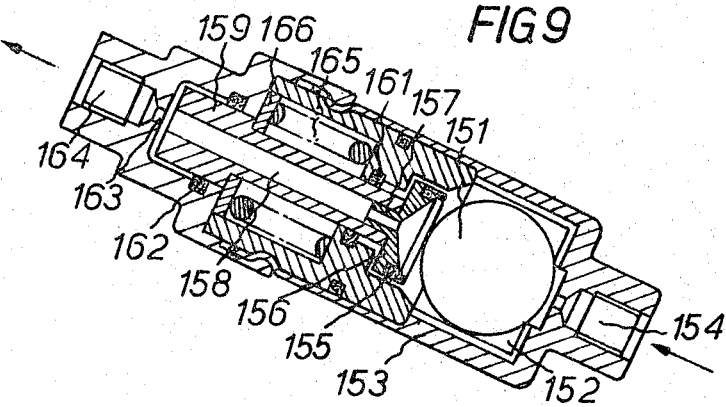
FIGURE 9 is a longitudinal section of a simplified unit.

In the unit shown in FIGURE 9 the ball which forms the inertia member and the differential piston are arranged in line which simplifies the construction of the unit and reduces its overall dimensions.

The ball 151 is located in a chamber 152 at one end of a cylindrical body or housing 153, an inlet 154 in the rear end of the body being connected to a master cylinder. The ball normally rests under gravity at the rear end of the chamber but when a predetermined rate of deceleration is reached it rolls forwardly into sealing engagement with a flexible annular seating 155 on a head 156. The head is integral with a hollow forwardly extending spigot 157 entering the rear end of a bore 158 extending axially through a differential piston 159. The smaller rear end of the piston works through a seal 161 in the body and the larger forward end works through a seal 162. The The forward end of the stepped bore in which the piston works is in communication through a passage 163 with an outlet 164 leading to the slave cylinders of the brakes. The piston is loaded by a compression spring 165 which urges it towards the forward end of the unit and is located in an annular recess in the body around the piston, the spring abutting between an internal shoulder at the rear end of the recess and a washer 166 abutting against the step in the piston.

With the ball in its normal position fluid from the master cylinder entering the inlet 154 flows around the ball through the chamber 152 and through the hollow spigot on the head 156 and the bore 158 in the differential piston to the outlet 164 and so to the slave cylinders of the brakes. As the pressure applied to the brakes builds up the differential piston moves to the right against the action of the spring 165 owing to the difference in the areas of the ends of the piston, so that the seating 155 moves through a short distance toward the ball. When a predetermined rate of deceleration is reached the ball rolls forward into the engagement with the seating to close off the passage 158 through the piston, and thereafter any increase in the master cylinder pressure moves the differential piston to the left to increase the pressure applied to the brakes but at a rate of increase less than the rate of increase in the master cylinder pressure.

In a modification the valve seating and the ball may be coupled together by a cage permitting a limited amount of relative movement, the seating and the ball moving as a unit until the ball is moved by inertia forces into engagement with the seating.

The various forms of the invention illustrated have a number of important advantages in practice.

For example, in the unit shown in FIGURE 8 the differential piston is loaded by the spring 138 in which energy is stored when the piston is moved to the right by the braking pressure acting on the larger end of the piston, and immediately the valve closes the spring gives up its energy in moving the piston to the left. The spring thus initiates the application of an increased pressure to the rear wheel brakes and the delay which would otherwise occur while the master cylinder pressure builds up on the smaller end of the piston is eliminated.

The plate 142 having the orifice 143 shown in FIGURE 8 is also important as it makes the valve flow-conscious and ensures rapid closing of the valve by the fluid flow on rapid applications of the brake.

In any of the constructions illustrated where the ball engages a seating the seating is preferably formed of rubber moulded with a metal reinforcement to prevent the seating from being unduly distorted by the pressure of the ball.

Another important advantage of the constructions shown in FIGURES 6, 7 and 8 is that the valve seating is independent of and separate from the bore in which the differential piston works which facilitates accurate manufacture and assembly.

We claim:

1. A fluid pressure control valve unit for a vehicle braking system incorporating a master cylinder and a brake slave cylinder, comprising a housing, partition means dividing said housing into a first chamber and a second chamber, a first port connected to said master cylinder and in communication with said first chamber, a second port connected to said brake slave cylinder and in communication with said second chamber, a stepped bore in said partition connecting said first and second chambers, a differential piston working in said stepped bore, wherein the larger end of said piston is connected with said second chamber and the smaller end with said first chamber, a spring loading said piston axially in a direction towards the end of the bore of larger diameter, a passage in said partition means remote from said stepped bore and connecting said first and second chambers, and valve means for controlling fluid flow through said passage, said valve means comprising a stationary valve seating, and an inertia-operated valve member housed in said first chamber normally permitting communication through said passage but adapted to co-operate with said valve seating to cut-off communication between said first and second chambers when said inertia member is subjected to a deceleration in excess of a predetermined value.

2. A fluid pressure control valve unit as claimed in claim 1 wherein said inertia-operated valve member comprises a ball adapted to co-operate with said seating and rolling on an inclined surface of which the inclination is varied automatically in accordance with the master cylinder pressure required to produce a predetermined rate of deceleration.

3. A fluid pressure control valve unit as claimed in claim 1 wherein said inertia-operated valve member comprises a ball adapted to co-operate with said seating and rolling on an inclined surface of which the inclination is varied automatically in accordance with the axial position of the differential piston.

4. A fluid pressure control valve unit as claimed in claim 1 wherein said inertia-operated valve member comprises a ball adapted to co-operate with said seating and to roll on an inclined surface and the ball is influenced by a magnet of which the position relative to the ball is varied in accordance with the axial position of the differential piston.

5. A fluid pressure control valve unit for a vehicle braking system, comprising a housing, partition means dividing said housing into a first chamber and a second chamber, a first port connected to said first chamber, a second port connected to said chamber, a stepped bore in said partition connecting said first and second chambers, a differential piston working in said stepped bore, a passage in said partition means remote from said stepped bore and connecting said first and second chambers, and valve means for controlling fluid flow through said passage, said valve means comprising a stationary valve seating, and an inertia-operated valve member normally permitting communication through said passage but adapted to co-operate with said valve seating to cut-off communication between said first and second chambers when said inertia member is subjected to a deceleration in excess of a predetermined value, wherein said inertia-operated valve member comprises a ball adapted to cooperate with said seating and to roll on an inclined surface in said first chamber, and there is included an orifice in the opposite side of the first chamber from the seating through which hydraulic fluid from a master cylinder enters said first chamber whereby on rapid operation of the master cylinder by a brake pedal fluid is forced from the orifice in the form of a jet which impinges on the ball and urges it into engagement with said seating independently of the inertia forces.

6. Means for controlling the braking effort applied to one pair of wheels of a vehicle comprising a unit adapted to be included between a master cylinder and the slave cylinders of brakes on the said wheels and incorporating an inertia-operated valve which cuts off communication between the master cylinder and the slave cylinders at a predetermined rate of deceleration, a differential piston working in a stepped bore and exposed at its end of smaller diameter to the master cylinder pressure and at its end of greater diameter to the pressure in the slave cylinders, and a spring loading said piston axially in a direction towards its end of greater diameter at least when said piston is subjected to said master cylinder pressure.

7. A unit controlling the braking effort applied to one pair of wheels of a vehicle comprising a body, an inlet adapted to be connected to an hydraulic master cylinder, an outlet adapted to be connected to slave cylinders of brakes on said wheels, a first passage connecting said inlet and outlet and incorporating an inertia-operated valve for controlling flow through said passage, a second passage connecting said inlet and outlet independently of said first passage and including a stepped bore of which the larger end is in communication with said outlet and the smaller end with said inlet, a differential piston working in said stepped bore, and a spring loading said piston axially in a direction towards the end of the bore of larger diameter at least when said piston is subjected to pressure from said master cylinder.

References Cited by the Examiner

UNITED STATES PATENTS

| | | | |
|---|---|---|---|
| 2,903,100 | 9/1959 | Freeman | 303—24 |
| 2,934,381 | 4/1960 | Hill | 303—24 |
| 3,143,379 | 8/1964 | Eksergiam | 303—24 |
| 3,147,045 | 9/1964 | Stelzer | 303—24 |
| 3,147,046 | 9/1964 | Stelzer | 303—24 |
| 3,163,473 | 12/1964 | Stelzer | 303—6 |
| 3,217,494 | 11/1965 | Stelzer | 303—6 XR |

FOREIGN PATENTS 900,999   7/1962   Great Britain.

EUGENE G. BOTZ, *Primary Examiner.*